United States Patent
Watanabe et al.

(10) Patent No.: US 9,946,078 B2
(45) Date of Patent: Apr. 17, 2018

(54) HEAD-UP DISPLAY DEVICE

(71) Applicant: AISIN AW CO., LTD., Anjo-shi, Aichi-ken (JP)

(72) Inventors: Kenji Watanabe, Okazaki (JP); Hiroyuki Miyake, Okazaki (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/895,863

(22) PCT Filed: Mar. 28, 2014

(86) PCT No.: PCT/JP2014/059142
§ 371 (c)(1),
(2) Date: Dec. 3, 2015

(87) PCT Pub. No.: WO2014/208165
PCT Pub. Date: Dec. 31, 2014

(65) Prior Publication Data
US 2016/0124231 A1    May 5, 2016

(30) Foreign Application Priority Data

Jun. 28, 2013   (JP) ................................. 2013-136975

(51) Int. Cl.
*G02B 27/01* (2006.01)
*G02B 13/16* (2006.01)
(Continued)

(52) U.S. Cl.
CPC .......... *G02B 27/0179* (2013.01); *B60K 35/00* (2013.01); *G02B 13/16* (2013.01);
(Continued)

(58) Field of Classification Search
CPC .... G02B 7/011; G02B 27/0149; G02B 27/01; G02B 27/0103; G02B 27/0172;
(Continued)

(56) References Cited

U.S. PATENT DOCUMENTS 8,305,295 B2 * 11/2012 Lvovskiy ........... G02B 27/0101
345/1.1
9,329,388 B1 * 5/2016 Amirparviz ........ G02B 27/4233
(Continued)

FOREIGN PATENT DOCUMENTS

JP   S62-29938 U   2/1987
JP   S64-44914 A   2/1989
(Continued)

OTHER PUBLICATIONS

May 19, 2016 European Search Report issued in European Patent Application No. 14818117.5.
(Continued)

*Primary Examiner* — Jie Lei
(74) *Attorney, Agent, or Firm* — Oliff PLC

(57) ABSTRACT

A head-up display device including a screen; a projector that projects a visual image to the screen using a projection lens; and an image generator that generates a virtual image of the visual image to be visually recognized by a user from the visual image projected to the screen, wherein the visual image is composed of a first visual image and a second visual image; and the image generator generates a first virtual image, which is a virtual image of the first visual image, from the first visual image, and generates a second virtual image, which is a virtual image of the second visual image, from the second visual image.

6 Claims, 11 Drawing Sheets

(51) Int. Cl.
*G06T 19/00* (2011.01)
*B60K 35/00* (2006.01)
*G03B 21/10* (2006.01)
*G03B 21/28* (2006.01)

(52) U.S. Cl.
CPC ..... *G02B 27/0101* (2013.01); *G02B 27/0149* (2013.01); *G06T 19/006* (2013.01); *G02B 2027/0127* (2013.01); *G02B 2027/0154* (2013.01); *G02B 2027/0185* (2013.01); *G03B 21/10* (2013.01); *G03B 21/28* (2013.01)

(58) Field of Classification Search
CPC ............ G02B 27/0176; G02B 27/0179; G02B 27/0101; G02B 27/017; G02B 13/16; G02B 21/28; G02B 21/10; G02B 2027/0123; G02B 2027/0185; G02B 2027/0138; G02B 2027/0154; G02B 2027/0127; B60K 35/00; G06T 19/00; G06T 19/006; G01S 1/02
USPC .......... 359/13, 630–633; 345/7, 8, 419, 633; 348/115, 116; 349/11
See application file for complete search history.

(56) References Cited

U.S. PATENT DOCUMENTS

| 2009/0160736 | A1* | 6/2009 | Shikita | G02B 27/0101 345/7 |
| 2013/0258486 | A1* | 10/2013 | Ionescu | G02B 27/0172 359/630 |
| 2016/0004076 | A1* | 1/2016 | Matsubara | G02B 27/0101 345/7 |

FOREIGN PATENT DOCUMENTS

| JP | 2004-126226 A | 4/2004 |
| JP | 2009-150947 A | 7/2009 |
| WO | 2012/036098 A1 | 3/2012 |

OTHER PUBLICATIONS

Jun. 17, 2014 Search Report issued in International Patent Application No. PCT/JP2014/059142.

* cited by examiner

FIG. 10
FIRST PROJECTION MODE
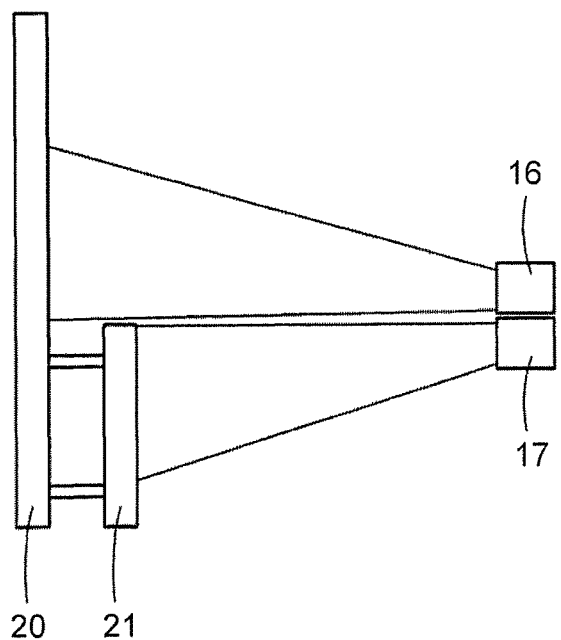
SECOND PROJECTION MODE
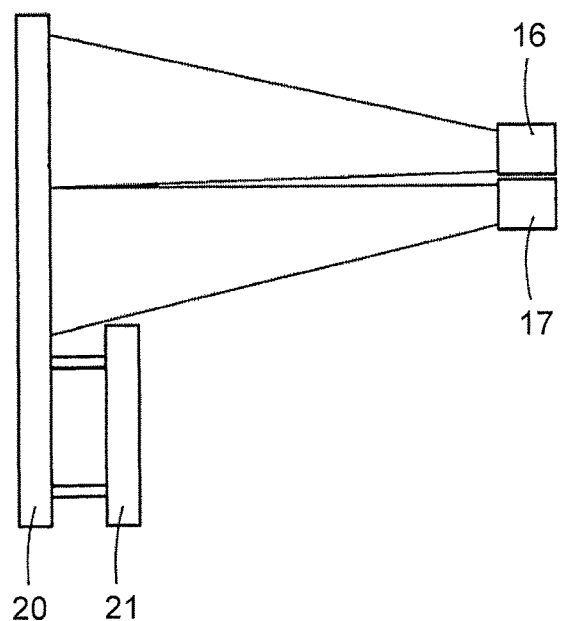

FIG. 13
POSITION SETTING TABLE
| GENERATION DISTANCE L2(m) | POSITION OF SECOND SCREEN | POSITION OF SECOND PROJECTION LENS |
|---|---|---|
| 2.5 | A1 | B1 |
| 3.0 | A2 | B2 |
| ... | ... | ... |
| 20.0 | A36 | B36 |
FIG. 14
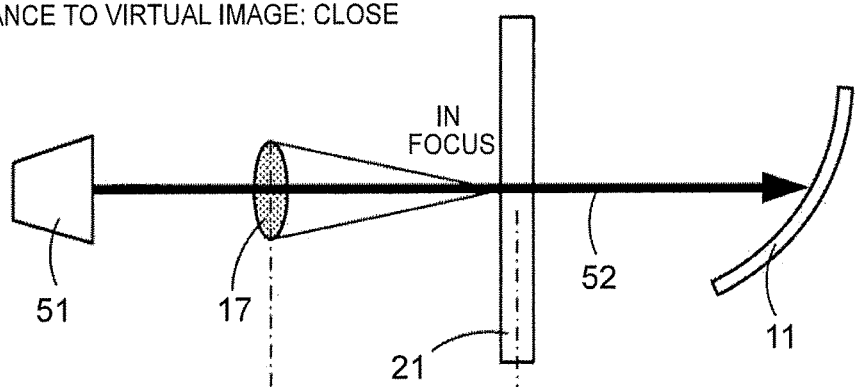
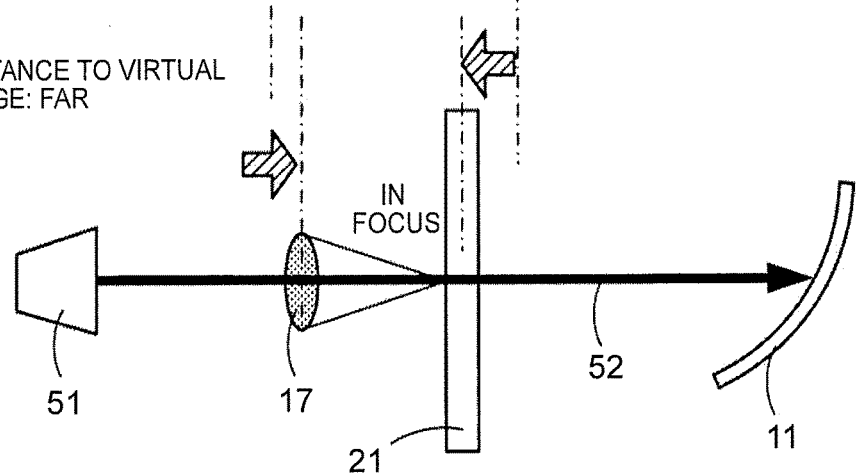

FIG. 15
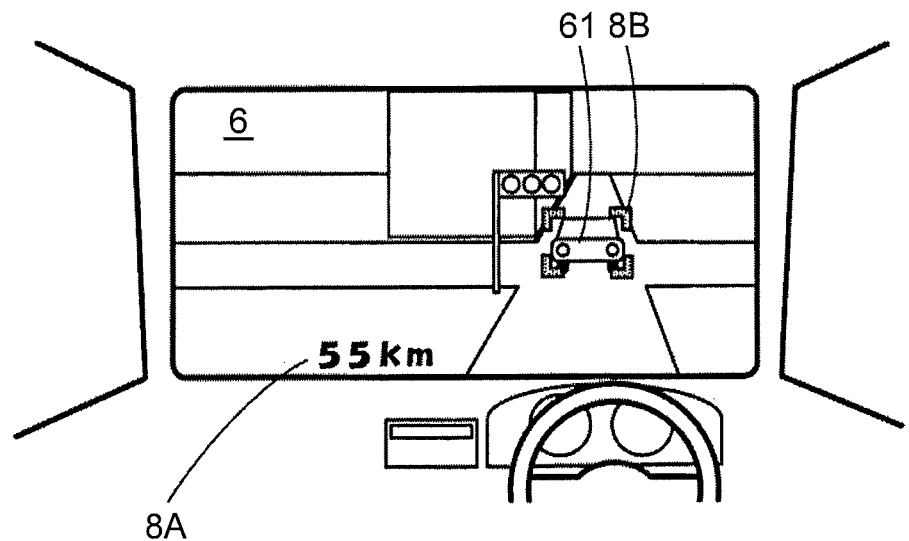
VEHICLE APPROACHES
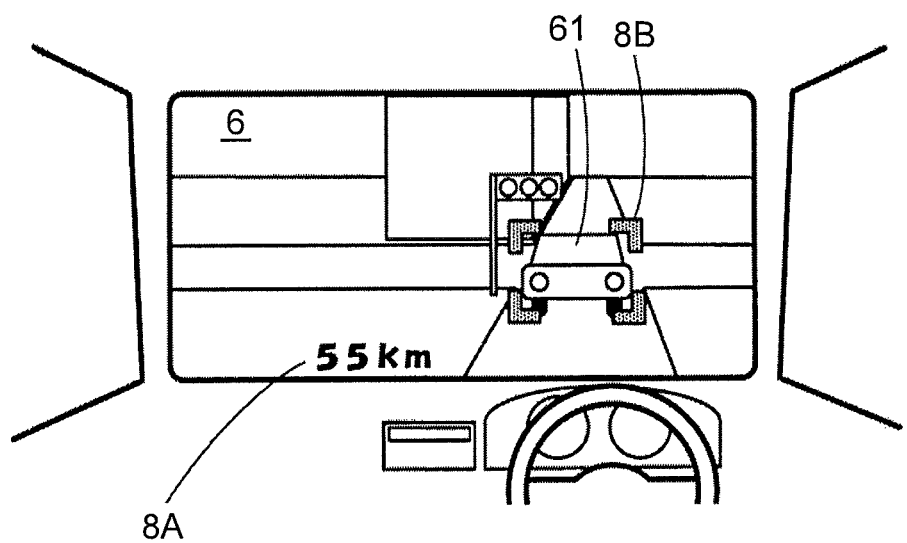

HEAD-UP DISPLAY DEVICE

BACKGROUND

The present disclosure relates to a head-up display device that is mountable on a mobile body and that generates various visual images to be visually recognized by a passenger of the mobile body.

Hitherto, various means have been used as an information providing device for providing a passenger of a mobile body such as a vehicle with route guidance and drive information such as a warning of an obstacle. Examples of such means include display on a liquid crystal display installed in the mobile body and audio output from a speaker. In recent years, a head-up display device (hereinafter referred to as an "HUD") has been provided as an example of the information providing device.

As described in Japanese Patent Application Publication No. 2009-150947, an HUD installed in a vehicle, in particular, as an example of a mobile body can generate drive information (such as display of the speed and display of route guidance, for example) as a virtual image as superimposed on the foreground in the forward field of view ahead of a window (e.g. the windshield) of the vehicle as seen from a passenger of the vehicle. As a result, it is possible to reduce movement of the line of vision as much as possible when the passenger visually recognizes the drive information, and to reduce a burden during drive.

SUMMARY

In order to reduce a burden during drive on the passenger of the vehicle, it is important to appropriately set the position at which a virtual image is generated (more specifically, the distance from the passenger to the virtual image). In order to generate a virtual image for warning of an obstacle, for example, it is desirable to generate the virtual image at the position at which the obstacle is actually present. In the case where a virtual image for providing guidance on a right or left turn to be made on a road is to be generated, meanwhile, it is desirable to generate the virtual image at the location of the right or left turn.

Japanese Patent Application Publication No. 2009-150947 discloses a device in which a screen to which a visual image is projected from a projector is configured to be movable in position forward and rearward along an optical path to adjust the position at which the virtual image is generated. The document further discloses that the screen is split into a plurality of screens in the left-right direction, and that the screens are configured to be movable to different positions so that a plurality of virtual images are generated at different distances at the same time.

However, in the case where a passenger of a vehicle visually recognizes an external environment from a window, in general, what is seen on the lower side is positioned closer to the vehicle, and what is seen on the upper side is positioned farther from the vehicle. In the example illustrated in FIG. 16, for example, a vehicle 102 positioned on the lower side in a windshield 101 is positioned closer to the vehicle than a vehicle 103 positioned on the upper side. Meanwhile, the vehicle 103 and a pedestrian 104, which are positioned side by side in the left-right direction, are positioned generally at the same distance from the vehicle. That is, in the case where a passenger of a vehicle visually recognizes an external environment from a window, there is a difference in distance in the up-down direction, rather than in the left-right direction, of the external environment.

As described above, it is necessary that a virtual image should be generated at a position that corresponds to the external environment. In Japanese Patent Application Publication No. 2009-150947, however, the screen is split in only the left-right direction, and thus a plurality of virtual images cannot be generated at different distances in the up-down direction at the same time. In the example illustrated in FIG. 16, for example, a virtual image that corresponds to the distance to the vehicle 103 cannot be generated at the position of the vehicle 103 at the same time while generating a virtual image that corresponds to the distance to the vehicle 102 at the position of the vehicle 102.

The present disclosure according to an exemplary aspect provides a head-up display device that can generate a plurality of virtual images at different distances in the up-down direction at the same time.

According to an exemplary aspect of the present disclosure, a head-up display device includes a screen; a projector that projects a visual image to the screen using a projection lens; and an image generator that generates a virtual image of the visual image to be visually recognized by a user from the visual image projected to the screen, wherein the visual image is composed of a first visual image and a second visual image; the image generator generates a first virtual image, which is a virtual image of the first visual image, from the first visual image, and generates a second virtual image, which is a virtual image of the second visual image, from the second visual image; and the screen is composed of a first screen to which the first visual image is projected and a second screen to which the second visual image is projected, the first screen and the second screen being disposed such that the second virtual image is generated above the first virtual image.

With the head-up display device according to the present disclosure configured as described above, a plurality of virtual images can be generated at different distances in the up-down direction at the same time. Thus, in the case where a virtual image to be visually recognized by the user is generated, a plurality of virtual images can be generated at appropriate positions in correspondence with the difference in distance in an external environment visually recognized by the user.

BRIEF DESCRIPTION OF THE DRAWINGS

FIG. 10 illustrates modes of projection of the visual image from the projector for a case where the first screen and the second screen are moved in the up-down direction.

FIG. 13 illustrates an example of a position setting table.

FIG. 14 illustrates the positional relationship between the second screen and the second projection lens for a case where the second screen is moved.

FIG. 15 illustrates an example of a virtual image visually recognizable from a passenger of a vehicle.

DETAILED DESCRIPTION OF EMBODIMENTS

A head-up display device according to a specific embodiment of the present disclosure will be described in detail below with reference to the drawings.

Figure 1:
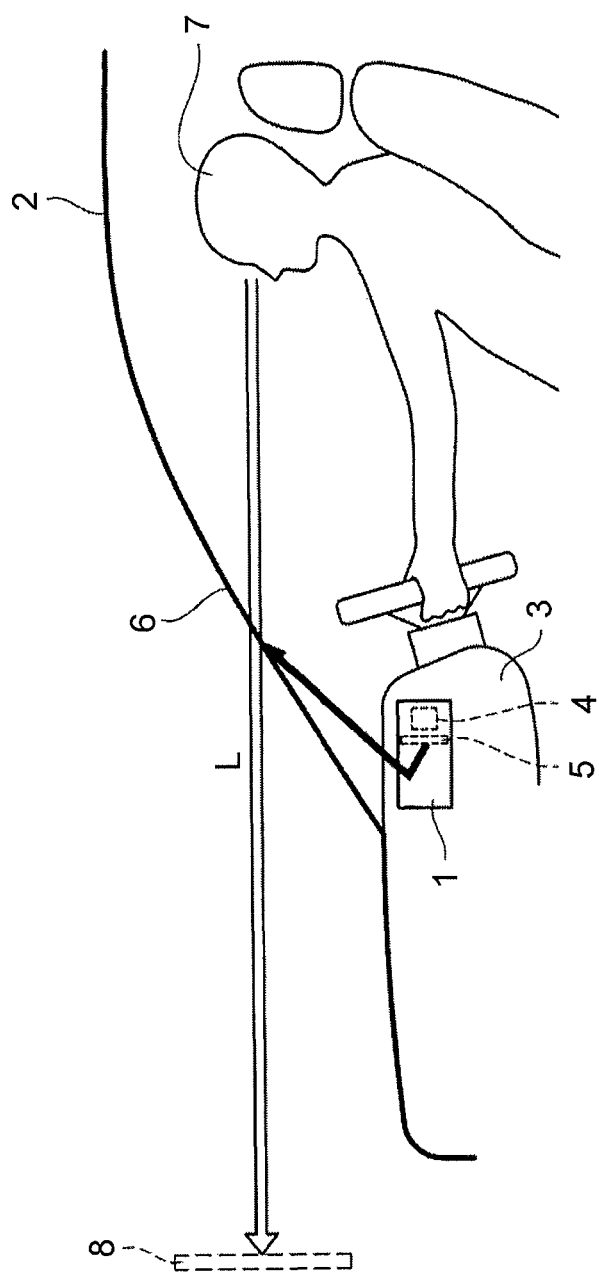
FIG. 1 illustrates a mode of installation of an HUD according to an embodiment in a vehicle.

First, the configuration of a head-up display device (hereinafter referred to as an "HUD") 1 according to the embodiment will be described with reference to FIG. 1. FIG. 1 illustrates a mode of installation of the HUD 1 according to the embodiment in a vehicle 2.

As illustrated in FIG. 1, the HUD 1 is installed inside a dashboard 3 of the vehicle 2, and internally includes a projector 4 and a screen 5 to which a visual image from the projector 4 is projected. The visual image projected to the screen 5 is reflected to a windshield 6 ahead of a driver's seat via a mirror and a Fresnel lens provided in the HUD 1 as discussed later to be visually recognized by a passenger 7 of the vehicle 2. Examples of the visual image projected to the screen 5 include information on the vehicle 2 and various kinds of information used to assist the passenger 7 in driving. Examples of such information include a warning of an obstacle (another vehicle or a pedestrian), a route for guidance set by a navigation device and guidance information (such as an arrow that indicates the direction of a right or left turn) based on the route for guidance, the current vehicle speed, a guide sign, a map image, traffic information, news, a weather forecast, the time, the screen of a connected smartphone, and a television program.

The HUD 1 according to the embodiment is configured such that in the case where the passenger 7 visually recognizes the visual image projected to the screen 5 and reflected to the windshield 6, the passenger 7 visually recognizes the visual image projected to the screen 5 as a virtual image 8 at a position far ahead of the windshield 6, rather than at the position of the windshield 6. The virtual image 8 that is visually recognizable by the passenger 7 is a visual image projected to the screen 5 via a mirror, and thus has been inverted in the up-down direction. In addition, the virtual image 8 has been changed in size via a Fresnel lens.

The position at which the virtual image 8 is generated, more specifically a distance (hereinafter referred to as a "generation distance") L from the passenger 7 to the virtual image 8, can be set as appropriate in accordance with the shape and the position of the mirror and the Fresnel lens provided in the HUD 1, the position of the screen 5 with respect to an optical path, and so forth. In the embodiment, in particular, the screen 5 is configured to be movable in position in the front-rear direction along the optical path. As a result, the generation distance L can be changed as appropriate. For example, the generation distance L can be changed between 2.5 m to 20 m.

Figure 2:
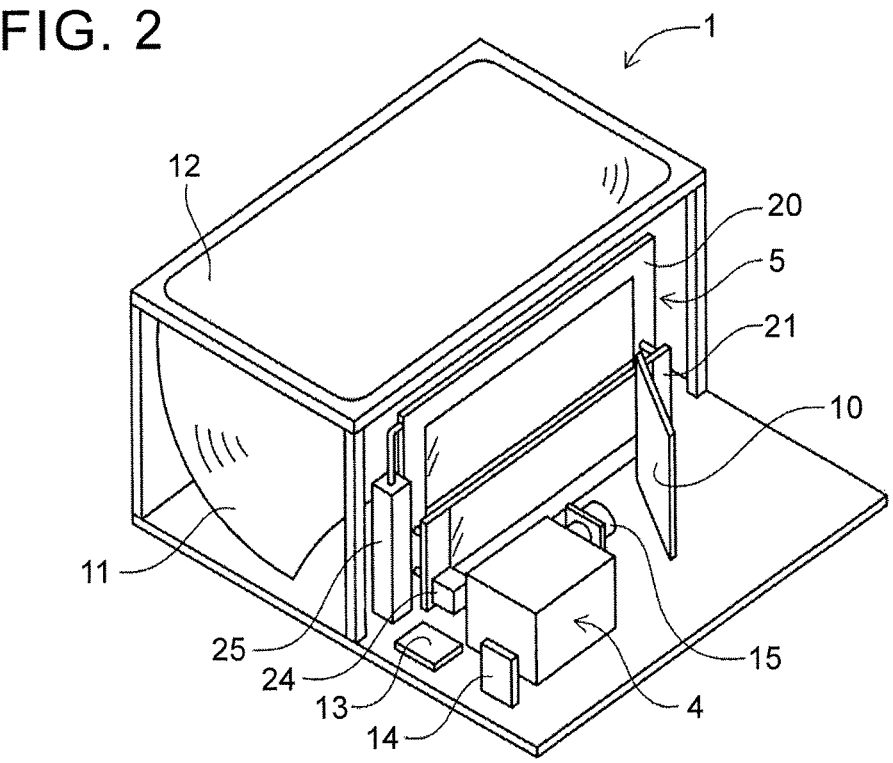
FIG. 2 illustrates the internal configuration of the HUD according to the embodiment.

Next, a more specific configuration of the HUD 1 will be described with reference to FIG. 2. FIG. 2 illustrates the internal configuration of the HUD 1 according to the embodiment.

As illustrated in FIG. 2, the HUD 1 is basically composed of the projector 4, the screen 5, a reflective mirror 10, a mirror 11, a Fresnel lens 12, a control circuit section 13, and a CAN interface 14.

Figure 3:
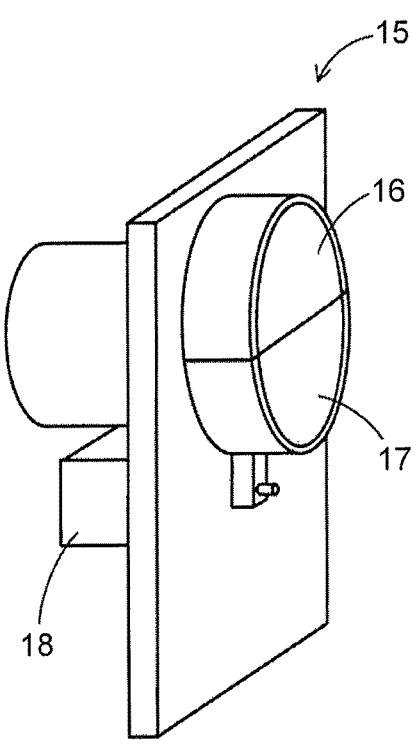
FIG. 3 illustrates a first projection lens and a second projection lens provided in a projector.

The projector 4 is a visual image projection device that uses an LED light source as a light source, and may be a DLP projector, for example. A liquid crystal projector or an LCOS projector may also be used as the projector 4. The projector 4 includes a projection lens 15 that projects a visual image. In the embodiment, the projection lens 15 is composed of two projection lenses, namely a first projection lens 16 and a second projection lens 17, that can project different visual images. FIG. 3 illustrates the first projection lens 16 and the second projection lens 17 provided in the projector 4.

Figure 4:
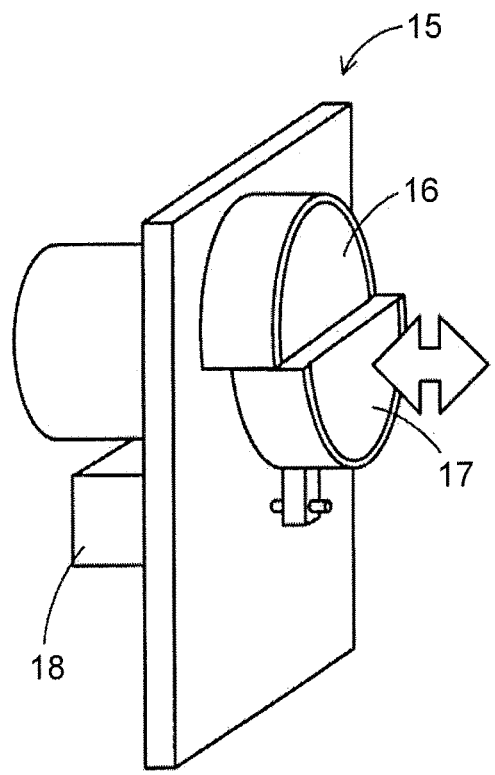
FIG. 4 illustrates a mode of movement of the second projection lens.

As illustrated in FIG. 3, the first projection lens 16 and the second projection lens 17 are shaped by splitting a single circular lens in the up-down direction. Further, the second projection lens 17 which is provided on the lower side is configured to be movable in the front-rear direction along the optical path. On the other hand, the first projection lens 16 is fixed in position. Specifically, the second projection lens 17 can be moved in the front-rear direction along the optical path as illustrated in FIG. 4 by driving a lens drive motor 18 provided on the back surface side of the second projection lens 17. In the embodiment, in particular, in the case where the screen 5 is moved in the front-rear direction along the optical path as discussed later, the second projection lens 17 is also moved accordingly in order that the focal point of the visual image projected from the second projection lens 17 coincides with the position of the screen 5 after being moved.

The lens drive motor 18 is constituted of a stepping motor. The HUD 1 can appropriately position the second projection lens 17 at a set position by controlling the lens drive motor 18 on the basis of a pulse signal transmitted from the control circuit section 13.

Figure 5:
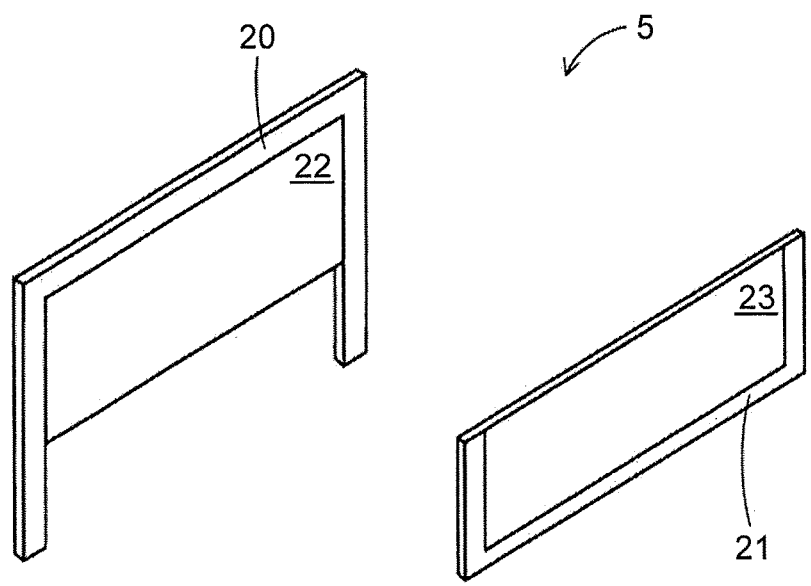
FIG. 5 illustrates a first screen and a second screen.

The screen 5 is a projected medium to which a visual image is projected from the projector 4. For example, a Fresnel screen, a diffusion screen, or the like may be used as the screen 5. In the embodiment, the screen 5 is composed of two screens, namely a first screen 20 and a second screen 21. FIG. 5 illustrates the first screen 20 and the second screen 21.

Figure 6:
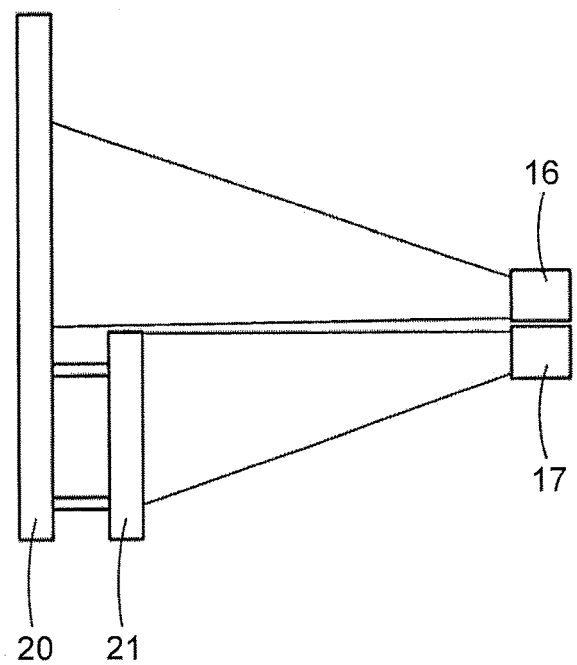
FIG. 6 illustrates a mode of projection of visual images from a projector to the first screen and the second screen.

As illustrated in FIG. 5, the first screen 20 has a projected area 22 which is provided on the upper side and to which a visual image is projected. As illustrated in FIG. 6, a visual image projected from the first projection lens 16 of the projector 4 is displayed on the first screen 20. Meanwhile, the second screen 21 has a projected area 23 which is provided on the lower side and to which a visual image is projected. As illustrated in FIG. 6, a visual image projected from the second projection lens 17 of the projector 4 is displayed on the second screen 21. As illustrated in FIGS. 2 and 6, the first screen 20 and the second screen 21 are disposed with a predetermined clearance in the front-rear direction along the optical path such that the projected areas 22 and 23 do not overlap each other. Thus, in the embodiment, the virtual image 8 is composed of a virtual image (hereinafter referred to as a "first virtual image 8A") of the visual image projected to the first screen 20 and a virtual image (hereinafter referred to as a "second virtual image 8B") of the visual image projected to the second screen 21.

Figure 7:
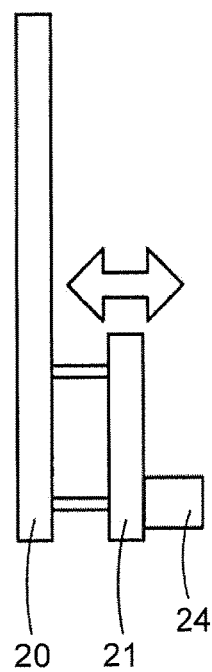
FIG. 7 illustrates a mode of movement of the second screen in the front-rear direction with respect to an optical path.

The second screen 21 is configured to be movable in the front-rear direction along the optical path. On the other hand, the first screen 20 is fixed in position in the front-rear direction. Specifically, the second screen 21 can be moved in the front-rear direction along the optical path by changing the distance between the first screen 20 and the second screen 21 as illustrated in FIG. 7 by driving a screen front-rear drive motor 24 provided on the back surface side of the second screen 21. As a result, the position (specifically, the generation distance L2 which is the distance from the passenger 7 to the second virtual image 8B) at which the second virtual image 8B which is a virtual image of the visual image projected to the second screen 21 is generated can be changed. The generation distance L2 depends on the distance from the mirror 11 to the second screen 21. That is, the generation distance L2 is changed to be longer or shorter in accordance with the distance from the mirror 11 to the second screen 21. For example, the generation distance L2 becomes longer as the distance from the mirror 11 to the second screen 21 becomes longer, and the generation distance L2 becomes shorter as the distance from the mirror 11 to the second screen 21 becomes shorter.

For example, when the second screen 21 is moved toward the projector 4 (toward the side on which the distance to the mirror 11 becomes longer), the generation distance L2 becomes longer (that is, the second virtual image 8B is visually recognized at a location farther from the passenger 7). When the second screen 21 is moved toward the side opposite to the projector 4 (toward the side on which the distance to the mirror 11 becomes shorter), on the other hand, the generation distance L2 becomes shorter (that is, the second virtual image 8B is visually recognized at a location closer from the passenger 7). Since the first screen 20 is fixed in position in the front-rear direction, the position (specifically, a generation distance L1 which is the distance from the passenger 7 to the first virtual image 8A) at which the first virtual image 8A which is a virtual image of the visual image projected to the first screen 20 is generated is stationary. Thus, the distance (|L2-L1|) from the first virtual image 8A to the second virtual image 8B is changed by changing the generation distance L2.

Figure 8:
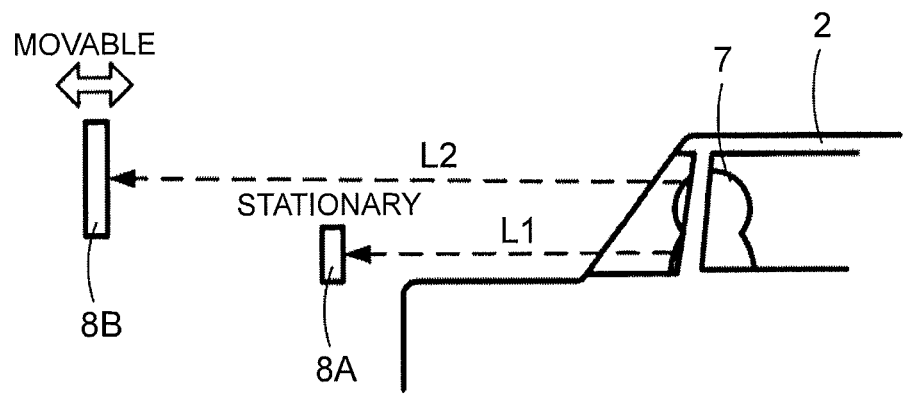
FIG. 8 illustrates virtual images generated by visual images projected to the first screen and the second screen.

Thus, in the case where the first screen 20 and the second screen 21 are at the same distance from the mirror 11 along the optical path, the first virtual image 8A and the second virtual image 8B are generated at the same position ahead of the vehicle 2. In the case where the first screen 20 and the second screen 21 are at different distances from the mirror 11 along the optical path, however, the first virtual image 8A and the second virtual image 8B are generated at different positions as illustrated in FIG. 8. As illustrated in FIGS. 5 and 6, the screens are disposed such that the projected area 22 of the first screen 20 is positioned above the projected area 23 of the second screen 21. Since the visual image is inverted upside down by the mirror 11, however, the second virtual image 8B is generated above the first virtual image 8A with respect to a direction that intersects the optical path.

Figure 9:
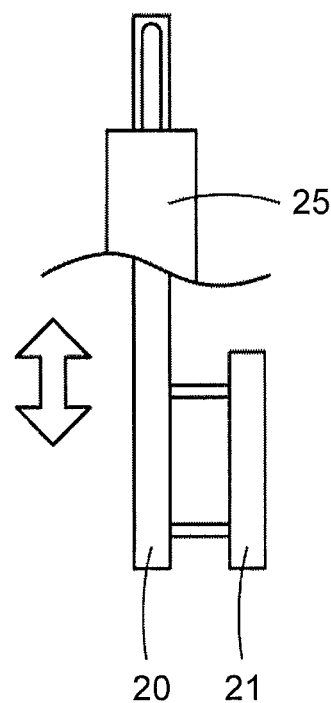
FIG. 9 illustrates a mode of movement of the first screen and the second screen in a direction that intersects the optical path.

In the embodiment, the first screen 20 and the second screen 21 are configured to be movable together in a direction that intersects the optical path. Specifically, the first screen 20 and the second screen 21 can be moved together in a direction that intersects the optical path as illustrated in FIG. 9 by driving a screen up-down drive motor 25 provided on a side surface of the first screen 20. As a result, as illustrated in FIG. 10, the mode of projection of an image to the screen 5 can be switched between a first projection mode in which the visual image from the projector 4 is projected to the first screen 20 and the second screen 21 and a second projection mode in which the visual image from the projector 4 is projected to only the first screen 20.

In the case where the mode of projection is the first projection mode, the HUD 1 basically projects different types of visual images from the first projection lens 16 and the second projection lens 17 (for example, a visual image for the current vehicle speed of the vehicle from the first projection lens 16 and a visual image for guidance information or warning information from the second projection lens 17) to the respective screens. In the case where the mode of projection is the second projection mode, on the other hand, the HUD 1 basically projects a single visual image obtained by combining visual images projected from the first projection lens 16 and the second projection lens 17 (for example, a visual image for the lower half of a television screen from the first projection lens 16 and a visual image for the upper half of the television screen from the second projection lens 17) to the first screen 20. Consequently, a visual image of a large size with no splitting line can be generated as a virtual image in the second projection mode. Different types of visual images can be projected from the first projection lens 16 and the second projection lens 17 also in the second projection mode.

The screen front-rear drive motor 24 and the screen up-down drive motor 25 are each constituted of a stepping motor. The HUD 1 can appropriately position the second projection lens 21 at a set position in the front-rear direction by controlling the screen front-rear drive motor 24 on the basis of a pulse signal transmitted from the control circuit section 13. In addition, the HUD 1 can appropriately position the first screen 20 and the second screen 21 at a set position in the up-down direction by controlling the screen up-down drive motor 25 on the basis of a pulse signal transmitted from the control circuit section 13.

The reflective mirror 10 is a reflective plate that changes the optical path by reflecting a visual image projected from the projector 4 as illustrated in FIG. 2 to project the visual image to the screen 5.

The mirror 11 is part of an image projector for reflecting visual image light from the screen 5 as illustrated in FIG. 2 to project the virtual image 8 (see FIG. 1) ahead of the passenger 7 via the windshield 6. A spherical concave mirror, an aspherical concave mirror, or a freely curved mirror for correcting distortion of the projected image may be used as the mirror 11.

The Fresnel lens 12 is a magnifying glass that magnifies the visual image projected to the screen 5 to generate the virtual image 8 as illustrated in FIG. 2. In the HUD 1 according to the embodiment, the visual image projected to the screen 5 is reflected to the windshield 6 via the mirror 11 and the Fresnel lens 12 to be visually recognized by the passenger 7. Thus, the visual image projected to the screen 5 is magnified at a position far ahead of the windshield 6 to be visually recognized by the passenger as the virtual image 8 (see FIG. 1).

Figure 11:
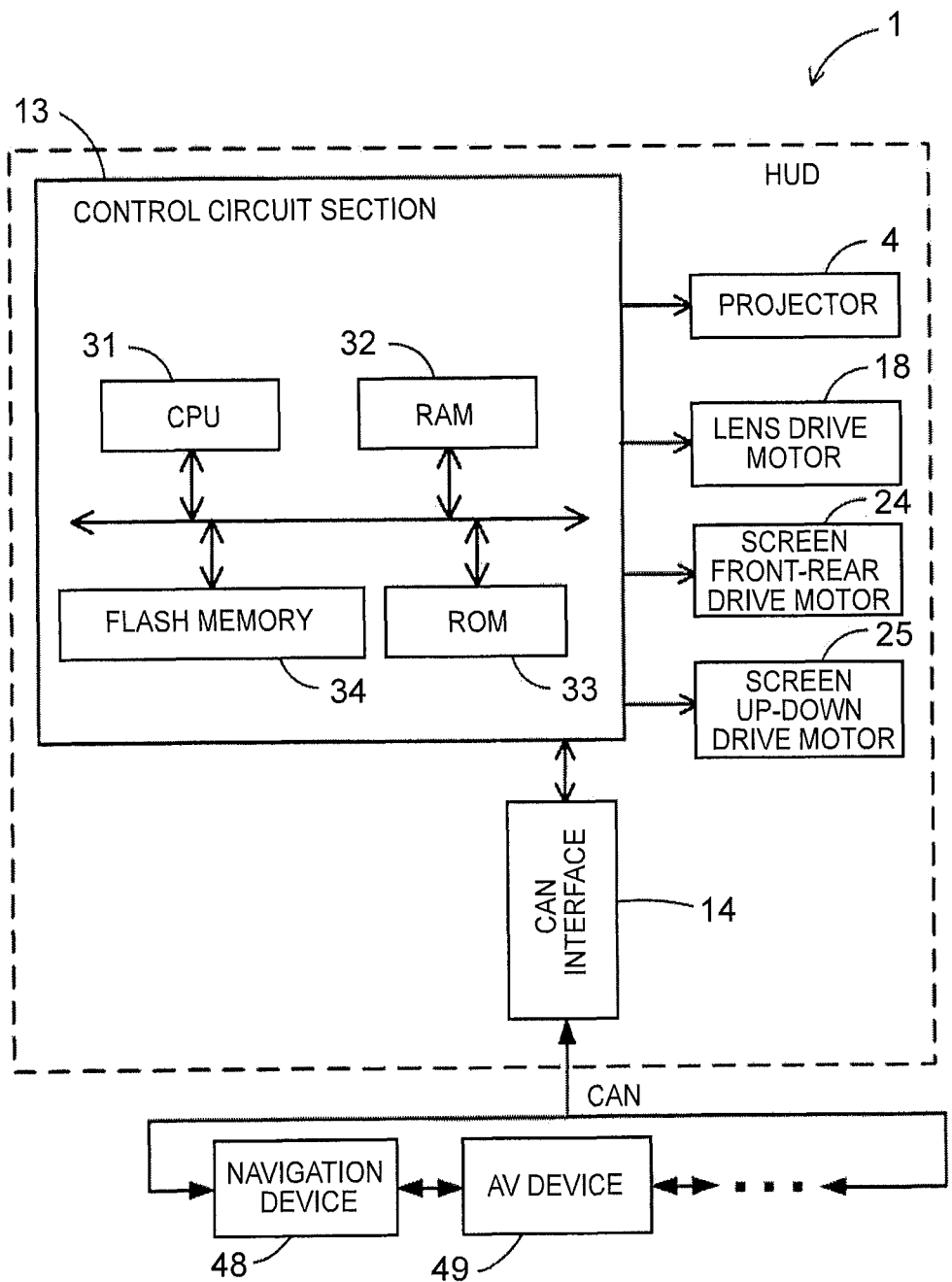
FIG. 11 is a block diagram illustrating the configuration of the HUD according to the embodiment.

The control circuit section 13 is an electronic control unit that controls the entire HUD 1. FIG. 11 is a block diagram illustrating the configuration of the HUD 1 according to the embodiment.

As illustrated in FIG. 11, the control circuit section 13 includes a CPU 31 that serves as a computation device and a control device, and internal storage devices such as a RAM 32 that is used as a working memory when the CPU 31 performs various computation processes, a ROM 33 that stores a control program, a virtual image generation processing program (see FIG. 12) to be discussed later, and so forth, and a flash memory 34 that stores a program read from the ROM 33 and a position setting table to be discussed later. In addition, the control circuit section 13 is connected to each of the projector 4, the lens drive motor 18, the screen front-rear drive motor 24, and the screen up-down drive motor 25 to control drive of the projector 4 and the various motors.

The CAN (controller area network) interface 14 is an interface that inputs and outputs data to and from a CAN which is an in-vehicle network standard installed in the vehicle to perform multiplex communication between various in-vehicle devices and control devices for vehicle devices. The HUD 1 is connected so as to be communicable with the various in-vehicle devices and the controls devices for vehicle devices (such as a navigation device 48 and an AV device 49, for example) via the CAN. Consequently, the HUD 1 can project an output screen of the navigation device 48, the AV device 49, etc.

Figure 12:
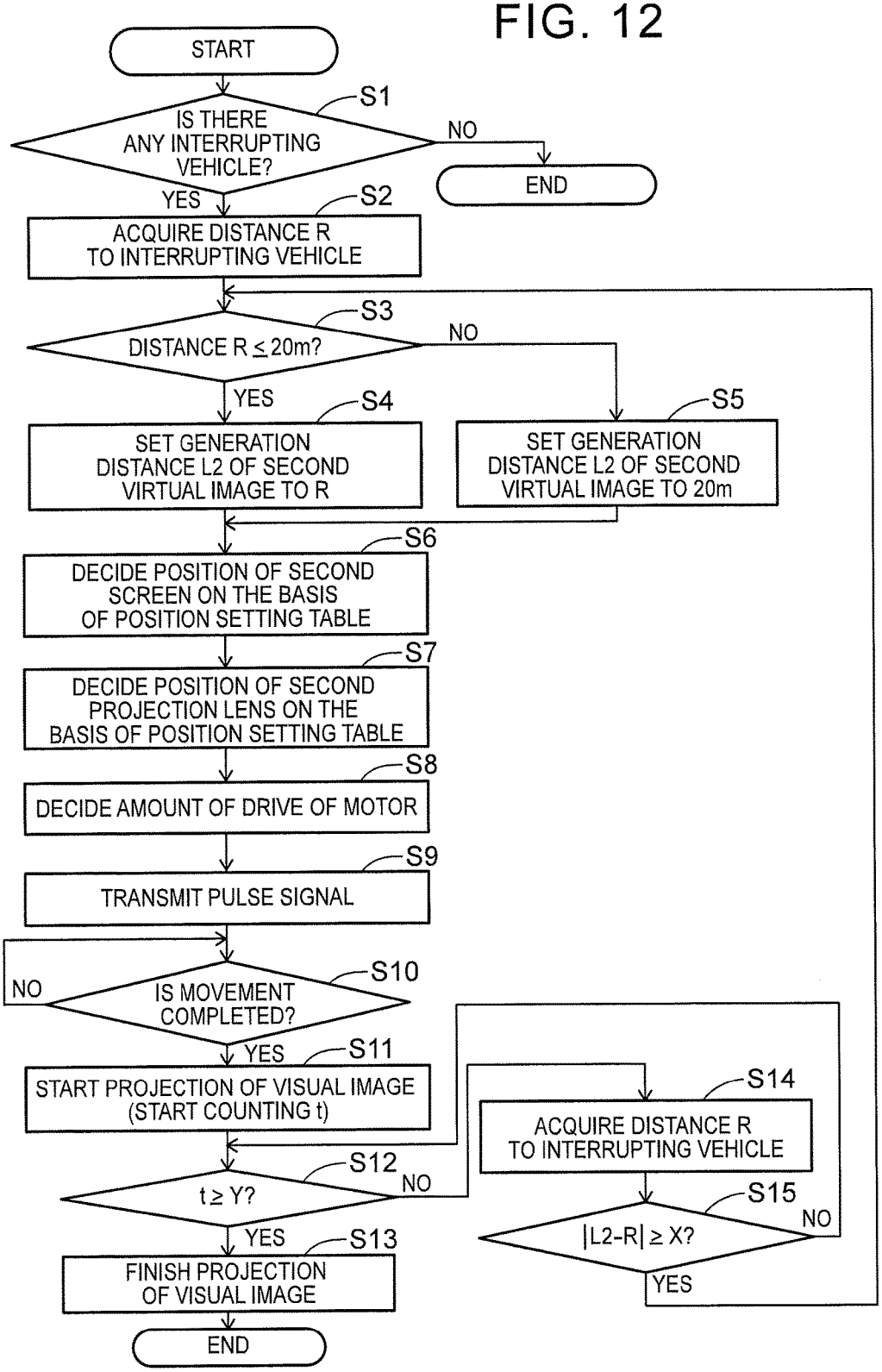
FIG. 12 is a flowchart of a virtual image generation processing program according to the embodiment.
Figure 16:
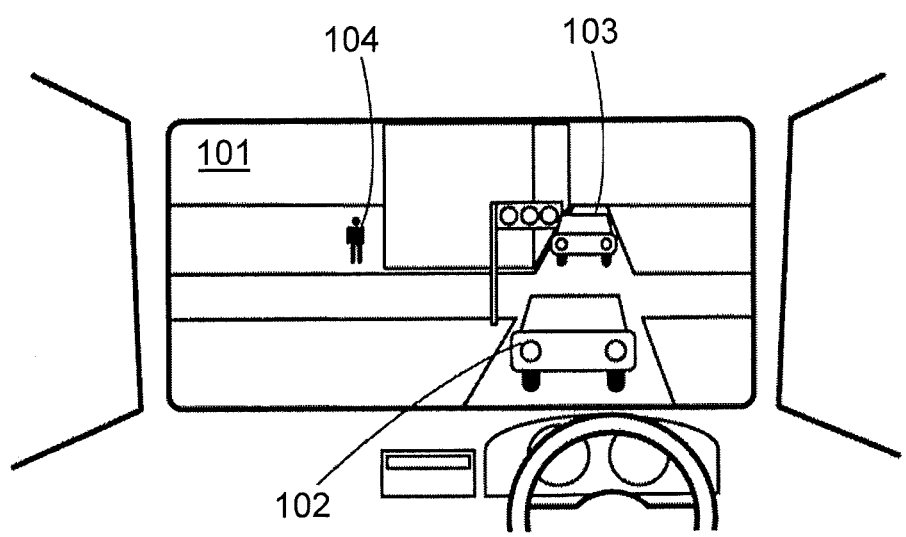
FIG. 16 illustrates an issue of the related art.

Subsequently, a virtual image generation processing program executed by the CPU 31 of the HUD 1 configured as described above will be described with reference to FIG. 12. FIG. 12 is a flowchart of the virtual image generation processing program according to the embodiment. The virtual image generation processing program is a program executed after ACC of the vehicle is turned on to generate a virtual image 8 for warning of another vehicle traveling in a different lane in the case where the other vehicle interrupts ahead of the vehicle in the travel direction. The program illustrated in the flowchart of FIG. 12 described below is stored in the RAM 32 or the ROM 33 of the HUD 1, and executed by the CPU 31. In the following description, the mode of projection of an image to the screen 5 is the first projection mode (FIG. 10) at all times.

In the virtual image generation processing program, first, in step (hereinafter abbreviated as "S") 1, the CPU 31 determines whether or not another vehicle traveling in a different lane has interrupted ahead of the vehicle in the travel direction. Specifically, the distance from a vehicle ahead is detected by a distance measurement sensor at all times, and it is determined that another vehicle has interrupted in the case where the distance is varied to become shorter by a predetermined amount or more at a time. Alternatively, information on turn signals of another vehicle traveling in a lane that is adjacent to the lane in which the vehicle is traveling may be acquired, and it may be determined that another vehicle has interrupted in the case where one of the turn signals on the side of the lane in which the vehicle is traveling is operated.

In the case where it is determined that another vehicle traveling in a different lane has interrupted ahead of the vehicle in the travel direction (S1: YES), the process proceeds to S2. In the case where it is determined that there is no interrupting vehicle (S1: NO), in contrast, the virtual image generation processing program is ended.

In S2, the CPU 31 acquires a distance R from the vehicle to another vehicle which has interrupted (hereinafter referred to as an "interrupting vehicle") on the basis of the result of detection performed by the distance measurement sensor or the like. The distance R may be acquired using a captured image captured by a front camera instead of the distance measurement sensor.

In S3, the CPU 31 determines whether or not the distance R acquired in S2 is equal to or less than 20 m. The distance as the criterion for determination performed in S3 is decided in accordance with the specifications of the HUD 1. Specifically, the distance may be the longest generation distance L2 at which the HUD 1 can generate the second virtual image 8B. In the embodiment, as described above, the position (specifically, the generation distance L2 which is the distance from the passenger 7 to the second virtual image 8B) at which the second virtual image 8B which is a virtual image of the visual image projected to the second screen 21 is generated can be changed by moving the second screen 21 in the front-rear direction along the optical path (see FIG. 8). The generation distance L2 becomes the longest in the case where the second screen 21 is moved toward the projector 4 the most. In the case where the longest generation distance L2 at which the HUD 1 can generate the second virtual image 8B is 20 m, the criterion for determination performed in S3 is 20 m. In the case where the longest generation distance L2 at which the HUD 1 can generate the second virtual image 8B is 30 m, meanwhile, the criterion for determination performed in S3 is 30 m. In the following example, the longest generation distance L2 at which the HUD 1 can generate the second virtual image 8B is assumed to be 20 m.

In the case where it is determined that the distance R acquired in S2 is equal to or less than 20 m (S3: YES), the process proceeds to S4. In the case where it is determined that the distance R acquired in S2 is not equal to or less than 20 m (S3: NO), the process proceeds to S5.

In S4, the CPU 31 sets the generation distance L2 for the second virtual image 8B to the distance R acquired in S2. In S5, on the other hand, the CPU 31 sets the generation distance L2 for the second virtual image 8B to 20 m which is the largest distance. After that, the CPU 31 controls the position of the second screen 21 such that the second virtual image 8B is generated at a position the generation distance L2 set in S4 or S5 away from the passenger 7 as discussed later.

Subsequently, in S6, the CPU 31 reads a position setting table from the flash memory 34, and decides the position of the second screen 21 on the basis of the generation distance L2 set in S4 or S5. Further, in S7, the CPU 31 decides the position of the second projection lens 17 on the basis of the position of the second screen 21 decided in S6. In the position setting table, as illustrated in FIG. 13, the position of the second screen 21 for generating the second virtual image 8B at the generation distance L2 is prescribed for each generation distance L2. In addition, the position of the second projection lens 17 is prescribed in correspondence with the position of the second screen 21.

As illustrated in FIG. 14, the second screen 21 and the second projection lens 17 are configured to be movable in position along an optical path 52 of a light source 51 of the projector 4. The generation distance L2 depends on the distance from the mirror 11 to the second screen 21. Thus, the position of the second screen 21 is decided such that the distance from the mirror 11 to the second screen 21 corresponds to the generation distance L2 set in S4 or S5. On the other hand, the position of the second projection lens 17 is decided such that the focal point of the visual image projected from the second projection lens 17 is adjusted onto the second screen 21. That is, if the second screen 21 is moved in the direction away from the mirror 11 (that is, the direction closer to the second projection lens 17) along the optical path in order to increase the generation distance L2, the second projection lens 17 is moved in the direction closer to the second screen 21, which is the opposite direction, along the optical path. If the second screen 21 is moved in the direction closer to the mirror 11 (that is, the direction away from the second projection lens 17) along the optical path in order to reduce the generation distance L2, on the other hand, the second projection lens 17 is moved in the direction away from the second screen 21, which is the opposite direction, along the optical path. That is, the position of the second screen 21 in the optical path 52 is first decided on the basis of the generation distance L2 set in S4 or S5, and the position of the second projection lens 17 in the optical path 52 is decided on the basis of the decided position of the second screen 21. The second projection lens 17 and the second screen 21 are moved in different directions from each other along the optical path 52.

As a result, even in the case where the second screen 21 is moved toward the second projection lens 17 in order to increase the generation distance L2, for example, it is possible to maintain a state in which the focal point of the projected visual image is adjusted onto the second screen 21 by also moving the second projection lens 17 toward the second screen 21 along with movement of the second screen 21. Consequently, a clear visual image can be projected also after the second screen 21 is moved.

Subsequently, in S8, the CPU 31 decides the amount of drive (number of pulses) required for the screen front-rear drive motor 24 to move the second screen 21 from the current position of the second screen 21 to the position decided in S6. Similarly, the CPU 31 decides the amount of drive (number of pulses) required for the lens drive motor 18 to move the second projection lens 17 from the current position of the second projection lens 17 to the position decided in S7.

After that, in S9, the CPU 31 transmits a pulse signal for driving the screen front-rear drive motor 24 by the amount of drive decided in S8 to the screen front-rear drive motor 24. Similarly, the CPU 31 transmits a pulse signal for driving the lens drive motor 18 by the amount of drive decided in S8 to the lens drive motor 18. When the pulse signal is received, the screen front-rear drive motor 24 and the lens drive motor 18 perform drive on the basis of the received pulse signal. As a result, the second screen 21 is moved to the position decided in S6, and the second projection lens 17 is moved to the position decided in S7.

Next, in S10, the CPU 31 determines whether or not movement of the second screen 21 and the second projection lens 17 has been completed. Specifically, it is determined that movement of the second screen 21 and the second projection lens 17 has been completed in the case where a signal indicating completion of drive is received from the screen front-rear drive motor 24 and the lens drive motor 18 to which a pulse signal is transmitted in S9.

In the case where it is determined that movement of the second screen 21 and the second projection lens 17 has been completed (S10: YES), the process proceeds to S11. In the case where it is determined that movement of the second screen 21 and the second projection lens 17 has not been completed (S10: NO), in contrast, the process stands by until such movement is completed.

In S11, the CPU 31 transmits a signal to the projector 4 to cause the projector 4 to start projecting a visual image. Examples of the visual image projected by the projector 4 include information on the vehicle 2 and various kinds of information used to assist the passenger 7 in driving. Examples of such information include a warning of an obstacle (another vehicle or a pedestrian), a route for guidance set by a navigation device and guidance information (such as an arrow that indicates the direction of a right or left turn) based on the route for guidance, the current vehicle speed, a guide sign, a map image, traffic information, news, a weather forecast, the time, the screen of a connected smartphone, and a television program.

In the embodiment, in particular, the visual image projected to the first screen 20 by the first projection lens 16 is a visual image for the current vehicle speed of the vehicle. Meanwhile, the visual image projected to the second screen 21 by the second projection lens 17 is a visual image for warning of an interrupting vehicle. In the embodiment, as illustrated in FIG. 2, the second screen 21 is disposed below the first screen 20. Thus, as a result of being reflected by the mirror 11, the second virtual image 8B which is a virtual image of the visual image projected to the second screen 21 is generated above the first virtual image 8A which is a virtual image of the visual image projected to the first screen 20.

Thus, as illustrated in FIG. 15, a numerical value that indicates the current vehicle speed is generated as the first virtual image 8A near the lower edge of the windshield 6 and ahead of the windshield 6 to be visually recognizable from the passenger. In addition, a frame that surrounds an interrupting vehicle 61 is generated as the second virtual image 8B near the center of the windshield 6 and ahead of the windshield 6 to be visually recognizable from the passenger. Because the first screen 20 is fixed in position, the position at which the first virtual image 8A is generated (specifically, the generation distance L1 which is the distance from the passenger 7 to the first virtual image 8A) is also stationary at a position 2.5 m ahead of the passenger 7. The generation distance L1 may be other than 2.5 m. It should be noted, however, that the generation distance L1 is preferably about 2 m to 4 m, because the first virtual image 8A is embedded in the road surface if the generation distance L1 is excessively long.

In the example illustrated in FIG. 15, a visual image for the current vehicle speed is displayed as the first virtual image 8A. However, a visual image for other information, the distance of which from the vehicle need not be changed, such as a guide sign, a map image, traffic information, news, a weather forecast, the time, the screen of a connected smartphone, and a television program, for example, may also be displayed. By setting the generation distance L1 to an appropriate constant distance (e.g. 2.5 m), generation of an unnatural virtual image such as one embedded in the road surface can be prevented even in the case where the position at which the second virtual image 8B is generated is changed with the interrupting vehicle 61 approaching the vehicle as illustrated in FIG. 15. Further, it is possible to reduce movement of the line of vision as much as possible when the passenger of the vehicle visually recognizes the first virtual image 8A, and to reduce a burden during drive.

On the other hand, as illustrated in FIG. 15, the position at which the second virtual image 8B is generated is the position the generation distance L2 set in S4 or S5 ahead of the vehicle (that is, the position of the interrupting vehicle 61). Thus, it is possible to reduce movement of the line of vision as much as possible when the passenger visually recognizes the second virtual image 8B, and to reduce a burden during drive.

After that, in S12, the CPU 31 determines whether or not an elapsed time t since projection of a visual image by the projector 4 is started in S11 has become equal to or more than a predetermined time Y (e.g. five seconds or more). The predetermined time Y can be changed as appropriate also in accordance with the content of the projected visual image.

In the case where it is determined that the elapsed time t since projection of a visual image by the projector 4 is started has become equal to or more than the predetermined time Y (S12: YES), projection of the visual image by the projector 4 is finished (S13). Only projection by the second projection lens 17 may be finished, and projection by the first projection lens 16 may be continued.

In the case where it is determined that the elapsed time t since projection of a visual image by the projector 4 is started has not become equal to or more than the predetermined time Y (S12: NO), on the other hand, the process proceeds to S14.

In S14, the CPU 31 acquires the distance R from the vehicle to the interrupting vehicle again.

Next, in S15, the CPU 31 determines whether or not the difference between the generation distance L2 set in S4 or S5 and the distance R acquired in S14 is equal to or more than a predetermined distance X (e.g. 2 m). The predetermined distance X can be changed as appropriate also in accordance with the content of the projected visual image.

In the case where it is determined that the difference between the generation distance L2 set in S4 or S5 and the distance R acquired in S14 is equal to or more than the predetermined distance X (S15: YES), the process proceeds to S3. After that, the generation distance L2 is newly set on the basis of the newly acquired distance R (S4 and S5) to move the second screen 21. As a result, the second virtual image 8B can be generated at the position of the interrupting vehicle after being changed even in the case where the distance from the vehicle to the interrupting vehicle is varied significantly.

In the case where it is determined that the difference between the generation distance L2 set in S4 or S5 and the distance R acquired in S14 is not equal to or more than the predetermined distance X (S15: NO), the process proceeds to S12 to continue projection of the current visual image.

With the HUD 1 according to the embodiment, as has been described in detail above, a virtual image of a visual image to be visually recognized by the passenger 7 of the vehicle is generated by projecting respective visual images from the projector 4 which uses an LED light source to the first screen 20 and the second screen 21 via the first projection lens 16 and the second projection lens 17, and reflecting the visual images projected to the first screen 20 and the second screen 21 to the windshield 6 of the vehicle 2 to be visually recognized by the passenger 7 of the vehicle. In addition, the first virtual image 8A which is based on the visual image projected to the first screen 20 and the second virtual image 8B which is based on the visual image projected to the second screen 21 are respectively disposed in the up-down direction at positions at different distances from the passenger 7 of the vehicle. Thus, a plurality of virtual images can be generated at different distances in the up-down direction at the same time. Thus, in the case where a virtual image to be visually recognized by the passenger 7 of the vehicle is generated, a plurality of virtual images can be generated at appropriate positions in correspondence with the difference in distance in an external environment visually recognized by the passenger 7 of the vehicle.

In particular, the distance from the first virtual image 8A to the second virtual image 8B can be changed. Thus, in the case where visual images for a plurality of objects such as an obstacle and an intersection located at different distances from the passenger 7 are to be displayed as virtual images, the virtual images can be generated at appropriate positions that match the distances to the objects. As a result, it is possible to reduce movement of the line of vision as much as possible when the passenger 7 visually recognizes the virtual images, and to reduce a burden.

A visual image for information, the distance to which from the passenger 7 need not be changed, such as the current vehicle speed, a guide sign, a map image, traffic information, news, a weather forecast, the time, the screen of a connected smartphone, and a television program is displayed as the first virtual image 8A, the distance to which from the passenger 7 is constant. Thus, generation of an unnatural virtual image such as a virtual image of such information embedded in the road can be prevented. On the other hand, a visual image for an object such as an obstacle and an intersection, the distance to which from the passenger 7 is variable, can be generated as the second virtual image 8B at an appropriate position that matches the distance from the passenger 7 to the object.

The distance from the first virtual image 8A to the second virtual image 8B is changed by moving the second screen 21. Thus, the distance from the first virtual image 8A to the second virtual image 8B can be controlled easily by changing the position of the second screen 21 without changing control for the projector 4 or the optical path.

The position at which the second virtual image 8B is generated is decided, and the position of the second screen 21 is decided on the basis of the decided position. Thus, in the case where a visual image for an object such as an obstacle and an intersection, the distance to which from the passenger 7 is variable, is displayed as a virtual image, the virtual image can be generated at an appropriate position that matches the distance from the passenger 7 to the object.

Further, virtual images for different types of visual images can be generated at different distances by splitting the lens of the projector 4 vertically in correspondence with the screen.

It should be understood that the present disclosure is not limited to the embodiment described above, and that various improvements and modifications may be made without departing from the scope and spirit of the present disclosure.

For example, in the embodiment, a virtual image is generated ahead of the windshield 6 of the vehicle 2 by the HUD 1. However, a virtual image may be generated ahead of a window other than the windshield 6. The visual image may not be reflected to the windshield 6 itself by the HUD 1, and may be reflected to a visor (combiner) installed around the windshield 6. A projector other than a projector that uses an LED as the light source may also be used as the projector 4.

In the embodiment, the HUD 1 is installed in the vehicle 2. However, the HUD 1 may be installed in a mobile body other than the vehicle 2. For example, the HUD 1 may be installed in a ship, an airplane, or the like. Alternatively, the HUD 1 may be installed in a ride-type attraction installed in an amusement facility. In this case, a virtual image can be generated around a ride to be visually recognized by a passenger of the ride.

In the embodiment, a visual image for information, the generation distance of which need not be changed, such as the current vehicle speed, a guide sign, a map image, traffic information, news, a weather forecast, the time, the screen of a connected smartphone, and a television program is displayed as the first virtual image 8A. As with the second virtual image 8B, however, the first virtual image 8A may also be a visual image for an object such as an obstacle and an intersection, the distance to which from the vehicle is variable (that is, information, the generation distance of which needs to be changed).

In the embodiment, only the second screen 21 is configured to be movable in the front-rear direction along the optical path. However, the first screen 20 may also be configured to be movable. Similarly, the first projection lens 16 may also be configured to be movable. In this case, the generation distance L1 of the first virtual image 8A can be changed. Alternatively, only the second screen 21 may be configured to be movable in the front-rear direction along the optical path, and the second projection lens 17 may be configured to be fixed in position.

In the embodiment, the screen is composed of two screens, namely the first screen 20 and the second screen 21, and the lens of the projector 4 is composed of two lenses, namely the first projection lens 16 and the second projection lens 17. However, the number of screens and lenses may be three pairs or more. Alternatively, the lens of the projector 4 may be composed of a single lens, and only the screen may be composed of a plurality of screens.

While a head-up display device according to a specific embodiment of the present disclosure has been described above, the head-up display device may also be configured as described below, and the following effect can be achieved in such cases.

For example, a first configuration is as follows.

A head-up display device includes a screen; a projector that projects a visual image to the screen using a projection lens; and an image generator that generates a virtual image of the visual image to be visually recognized by a user from the visual image projected to the screen, wherein the visual image is composed of a first visual image and a second visual image; the image generator generates a first virtual image, which is a virtual image of the first visual image, from the first visual image, and generates a second virtual image, which is a virtual image of the second visual image, from the second visual image; and the screen is composed of a first screen to which the first visual image is projected and a second screen to which the second visual image is projected, the first screen and the second screen being disposed such that the second virtual image is generated above the first virtual image.

With the head-up display device configured as described above, a plurality of virtual images can be generated at different distances in the up-down direction at the same time. Thus, in the case where a virtual image to be visually recognized by the user is generated, a plurality of virtual images can be generated at appropriate positions in correspondence with the difference in distance in an external environment visually recognized by the user.

A second configuration is as follows.

The head-up display device wherein the first screen and the second screen are respectively disposed in parallel with a direction that intersects an optical path of the projector such that the first virtual image and the second virtual image are respectively generated in parallel with the direction that intersects the optical path of the projector.

With the head-up display device configured as described above, the first virtual image and the second virtual image can be respectively generated in parallel with the direction that intersects the optical path of the projector.

A third configuration is as follows.

The head-up display device further including a processor that changes a distance from the first virtual image to the second virtual image.

With the head-up display device configured as described above, in particular, the distance from the first virtual image to the second virtual image can be changed. Thus, in the case where visual images for a plurality of objects such as an obstacle and an intersection located at different distances from the user are to be displayed as virtual images, the virtual images can be generated at appropriate positions that match the distances to the objects. As a result, it is possible to reduce movement of the line of vision as much as possible when the user visually recognizes the virtual image, and to reduce a burden.

A fourth configuration is as follows.

The head-up display device wherein the processor changes the distance from the first virtual image to the second virtual image by: making a distance from the user who visually recognizes the virtual image to the first virtual image constant; and changing a distance from the user to the second virtual image.

With the head-up display device configured as described above, a visual image for information, the distance to which from the user need not be changed, such as the current vehicle speed, a guide sign, a map image, traffic information, news, a weather forecast, the time, the screen of a connected smartphone, and a television program is displayed as the first virtual image, the distance to which from the user is constant. Thus, generation of an unnatural virtual image such as a virtual image of such information embedded in the road can be prevented. On the other hand, a visual image for an object such as an obstacle and an intersection, the distance to which from the user is variable, can be generated as the second virtual image at an appropriate position that matches the distance from the user to the object.

A fifth configuration is as follows.

The head-up display device wherein the first visual image is a visual image for information, a distance from the user to a virtual image generated on the basis of which need not be changed; and the second visual image is a visual image for information, a distance from the user to a virtual image generated on the basis of which needs to be changed. With the head-up display device configured as described above, information, the distance to which from the user need not be changed, and information, the distance to which from the user needs to be changed, can be appropriately generated as virtual images.

A sixth configuration is as follows.

The head-up display device wherein the processor changes the distance from the first virtual image to the second virtual image by moving the second screen in a front-rear direction along an optical path.

With the head-up display device configured as described above, the distance from the first virtual image to the second virtual image is changed by moving the second screen. Thus, the distance from the first virtual image to the second virtual image can be controlled easily by changing the position of the second screen without changing control for the projector or the optical path.

A seventh configuration is as follows.

The head-up display device wherein the processor: decides a position at which the second virtual image is generated; and decides a position of the second screen in the optical path on the basis of the position decided at which the second virtual image is generated, and moves the second screen to the position decided of the second screen in the optical path.

With the head-up display device configured as described above, the position at which the second virtual image is generated is decided, and the position of the second screen is decided on the basis of the decided position. Thus, in the case where a visual image for an object such as an obstacle and an intersection, the distance to which from the user is variable, is displayed as a virtual image, the virtual image can be generated at an appropriate position that matches the distance from the user to the object.

An eighth configuration is as follows.

The head-up display device wherein the projector includes a first projection lens that projects the first visual image to the first screen and a second projection lens that projects the second visual image to the second screen; and the first projection lens and the second projection lens are shaped by splitting a single circular lens in an up-down direction.

With the head-up display device configured as described above, virtual images for different types of visual images can be generated at different distances by splitting the lens of the projector vertically in correspondence with the screen.

The invention claimed is:

1. A head-up display device comprising:
   a screen;
   a projector that projects a visual image to the screen using a projection lens;
   an image generator that generates a virtual image of the visual image to be visually recognized by a user from the visual image projected to the screen, wherein
      the visual image is composed of a first visual image and a second visual image;
      the image generator generates a first virtual image, which is a virtual image of the first visual image, from the first visual image, and generates a second virtual image, which is a virtual image of the second visual image, from the second visual image; and
      the screen is composed of a first screen to which the first visual image is projected and a second screen to which the second visual image is projected, the first screen and the second screen being disposed such that the second virtual image is generated above the first virtual image, and the first screen being fixed along an optical path of the projector;
   a processor that changes a distance from the first virtual image to the second virtual image, wherein the processor changes the distance from the first virtual image to the second virtual image by:
      making a distance from the user who visually recognizes the virtual image to the first virtual image constant; and
      changing a distance from the user to the second virtual image based on an object in an external environment, wherein
   the first visual image is a visual image for information, a generation distance from the user to a virtual image generated of which need not be changed; and
   the second visual image is a visual image for information, a generation distance from the user to a virtual image generated of which needs to be changed.

2. The head-up display device according to claim 1, wherein
   the first screen and the second screen are respectively disposed in parallel with a direction that intersects the optical path of the projector such that the first virtual image and the second virtual image are respectively generated in parallel with the direction that intersects the optical path of the projector.

3. The head-up display device according to claim 1, wherein
   the processor changes the distance from the first virtual image to the second virtual image by moving the second screen in a front-rear direction along the optical path.

4. The head-up display device according to claim 3, wherein the processor:
   decides a position at which the second virtual image is generated; and
   decides a position of the second screen in the optical path on the basis of the position decided at which the second virtual image is generated, and
   moves the second screen to the position decided of the second screen in the optical path.

5. The head-up display device according claim 1, wherein
   the projector includes a first projection lens that projects the first visual image to the first screen and a second projection lens that projects the second visual image to the second screen; and
   the first projection lens and the second projection lens are shaped by splitting a single circular lens in an up-down direction.

6. A head-up display device comprising:
   a screen;
   a projector that projects a visual image to the screen using a projection lens; and
   an image generator that generates a virtual image of the visual image to be visually recognized by a user from the visual image projected to the screen, wherein
      the visual image is composed of a first visual image and a second visual image;
      the image generator generates a first virtual image, which is a virtual image of the first visual image, from the first visual image, and generates a second virtual image, which is a virtual image of the second visual image, from the second visual image;
      the screen is composed of a first screen to which the first visual image is projected and a second screen to which the second visual image is projected, the first screen and the second screen being disposed such that the second virtual image is generated above the first virtual image;
   the projector includes a first projection lens that projects the first visual image to the first screen and a second projection lens that projects the second visual image to the second screen; and
   the first projection lens and the second projection lens are shaped by splitting a single circular lens in an up-down direction.

* * * * *